Patented Oct. 19, 1954

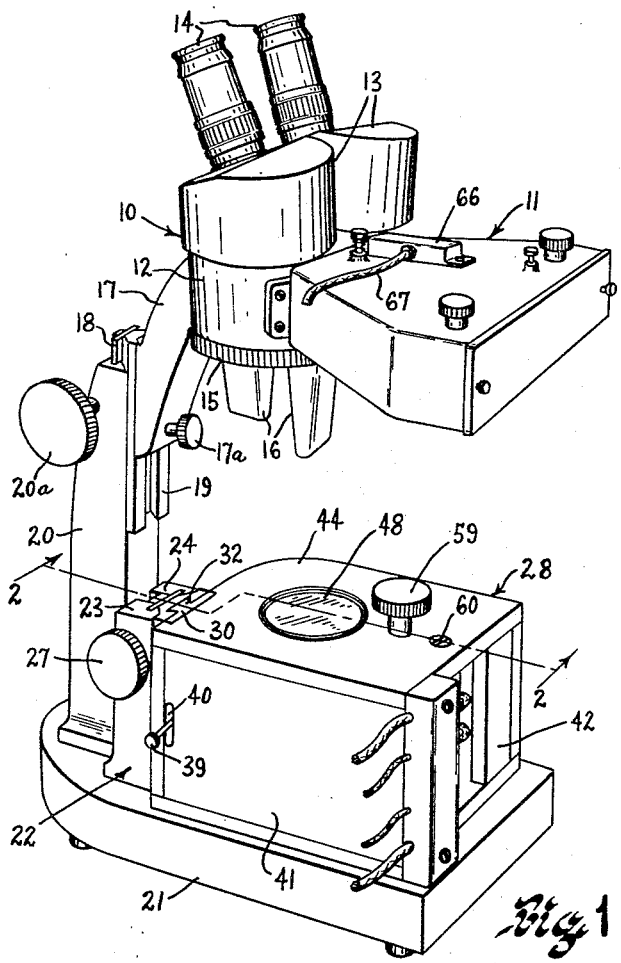
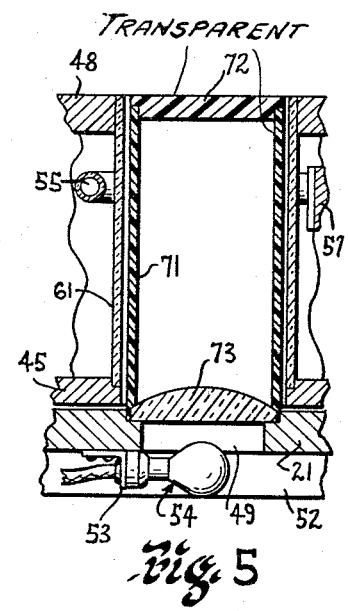
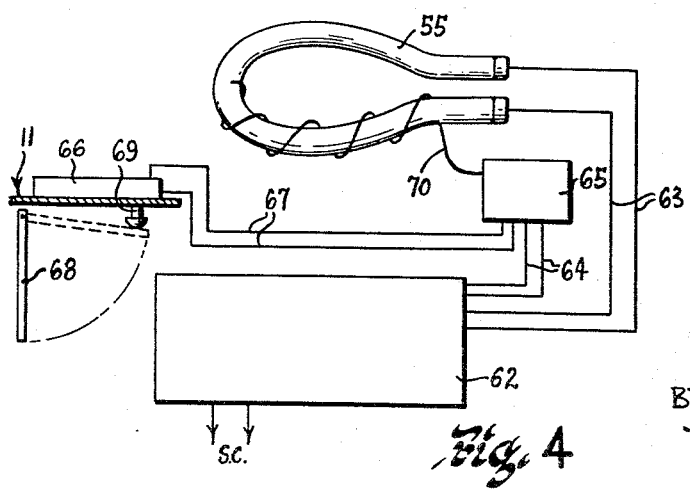

2,691,918

UNITED STATES PATENT OFFICE 2,691,918

ILLUMINATING MEANS FOR OPTICAL INSTRUMENTS

Richard S. Robins, Darien, and Walter J. Krasniewicz, Stamford, Conn., assignors to American Optical Company, Southbridge, Mass., a voluntary association of Massachusetts Application April 12, 1952, Serial No. 282,002

9 Claims. (Cl. 88—24)

This invention relates to improvements in optical instruments such as microscopes and has particular reference to a novel device for supporting and illuminating an object positioned in said instrument.

One of the principal objects of this invention is to provide a novel base for an optical instrument such as a microscope, which base is constructed and arranged to support an object in desired position in the instrument and embodies improved illumination means for illuminating said object.

Another object of this invention is to provide a novel base for a microscope which is adapted to support a specimen in proper position for viewing through the microscope and which embodies improved built-in illumination sources for ordinary transmission viewing and for substantially shadowless flash photography.

Another object is to provide a microscope base embodying improved means for supporting a specimen to be examined and photographed comprising cylindrical light transmitting means which is positioned beneath the objective of the microscope and on or adjacent to one end of which the specimen is adapted to be positioned, and improved illumination means associated therewith and controllable to provide adequate uniform illumination for ordinary transmission viewing and for substantially shadowless flash photography.

A further object is to provide a device of the above character wherein said light transmitting means for supporting a specimen to be viewed and photographed in predetermined position beneath the objective of the microscope is encircled by a flashtube and a tubular diffusing member whereby adequate diffused light is provided for illumination of the specimen for substantially shadowless flash photography, said diffusing member and flashtube being adjustable longitudinally of said light transmitting means and in a direction toward and away from said objective of the microscope whereby said specimen may be photographed with illumination from either well above or well below the plane of said specimen or from any position intermediate thereof.

A still further object is to provide a device of the above character which is relatively simple in construction and operation, highly efficient in its use, and comparatively inexpensive to manufacture.

Other objects and advantages of the invention will become apparent from the following description taken in connection with the accompanying drawings, in which:

Fig. 1 is a perspective view of a preferred embodiment of the invention;

Fig. 4 is a schematic diagram of the electrical control for the illuminating means; and, Fig. 5 is a fragmentary sectional view of a modified form of the invention.

Figure 2:
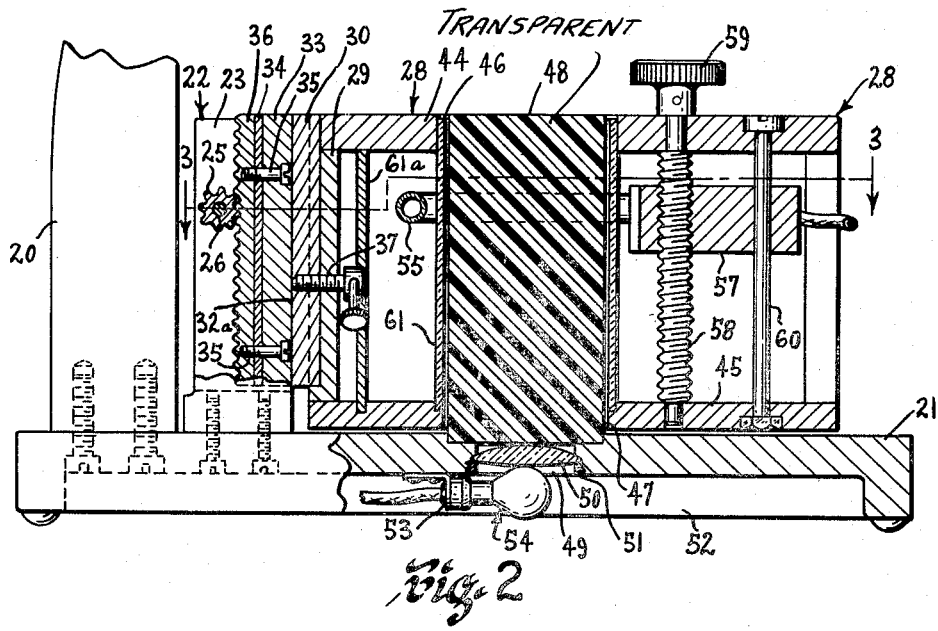
Fig. 2 is an enlarged fragmentary vertical sectional view taken substantially on line 2—2 of Fig. 1 looking in the direction of the arrows.

Although the prior art teaches the use of illumination means built into the base of instruments such as microscopes for directing illumination upon an object such as a specimen to be viewed through the microscope, such illumination means, although adequate for their intended use, were, in most instances, limited to such use.

In addition to providing an instrument base having embodied therein improved illuminating means of the above character it is a prime object of this invention to provide additional illuminating means and associated control means therefor particularly adaptable for use in obtaining substantially shadowless flash photography.

Referring more particularly to the drawings, wherein like characters of reference designate like parts throughout the several views, the preferred construction as shown in Fig. 1 embodies a microscope 10 preferably of the stereoscopic type having a steroscopic camera 11 attached thereto. The microscope and camera combination is fully described in pending United States Patent application Serial No. 278,896, filed March 27, 1952, in the names of Morden G. Brown, Richard S. Robins, and Walter N. Legan.

The microscope 10 illustrated in the drawings and as set forth in the previously mentioned application is of the steroscopic type and comprises a main housing 12 on the upper side of which are located a pair of spaced prism housings 13, with eyepieces 14 being disposed on the upper sides of the prism housings 13. Rotatably attached to the under side of the main housing 12 is a nosepiece 15 which carries a plurality of objectives 16, preferably of the parfocalized type having paired lens systems therein each of a different magnification, the nosepiece being rotatable to position a selected objective in position of use. The selected objective 16 projects two stereoscopically displaced optical paths to the eyes of a viewer through prism systems and lens systems of any suitable conventional types which are located respectively in the prism housings 13 and eyepieces 14. Thus, an object or specimen located beneath a selected objective can be viewed through the eyepieces 14 by the operator of the device.

The microscope 10 also preferably embodies means whereby reflecting devices can be moved into predetermined positions whereby they will intersect the respective optical paths and cause light rays traveling along said optical paths to be deflected in the direction of the camera 11, the camera 11 embodying suitable shutter means which can be operated to cause said light rays to expose a film carried by the camera. In this way the object or specimen which has been previously viewed through the microscope can also be photographed stereoscopically.

The entire microscope head and camera attached thereto are carried by a supporting arm 17 which has, in conventional manner, one end thereof fixedly attached to the main housing 12 and has its opposed end releasably attached to a slidable portion 18 which is in turn shaped to slidably interfit with a grooved portion of an upright 20 carried by a base 21. A knob 20a is connected by any suitable operating means so as to function, when manually rotated, to move the slidable portion 18 and arm 17, and consequently the microscope head and the camera, in a direction toward and away from a specimen located beneath the selected objective 16 whereby the microscope can be accurately focused.

A still further (coarse) adjustment can be accomplished by loosening locking screw 17a and vertically moving the supporting arm 17 fitting into grooved portion 19 with respect to the slidable portion 18, after which the device can be retained in desired adjusted position by tightening the locking screw 17a. For further details of the construction of the microscope 10 and camera 11 reference is made to the above mentioned pending U. S. patent application.

The base 21 has mounted thereon near the upright 20 a second shorter bifurcated upright 22 and between the respective upwardly extending portions 23 and 24 thereof is positioned a pinion 25 (Figs. 2 and 3), the pinion 25 being fixedly mounted on a shaft 26 having its ends rotatably mounted in the portions 23 and 24. One end of the shaft 26 carries a knob 27 which can be manipulated by the operator of the device to rotate the pinion 25. A box-like housing 28 has attached to one end wall 29 thereof a vertically extending slide member 30 which is secured to the wall 29 as by screws 31 (Fig. 3). The opposed side of the slide member 30 is provided with a portion 32 which is shaped to interfit with and to slide longitudinally within a vertical track 32a formed in the adjacent surface of a rack-supporting member 33.

The slide member 30 is adapted to be retained in desired relation with respect to the rack-supporting member 33 by means of a locking screw 37 which is adapted to extend through the wall 29 and the slide member 30, one end thereof being adapted to engage the inner surface of the track 32a in the supporting member 33. The opposed end of the locking screw 37 extends within the housing 28 and has a head 38 thereon to which is secured an operating lever 39, which operating lever 39 extends at right angles with respect to the longitudinal axis of the locking screw 37 and is adapted to project through a slot 40 provided therefor in the adjacent wall 41 of the housing 28. In order to move the slide 30 longitudinally of the track 32a in the supporting member 33, the operator of the device will move the lever 39 upwardly or downwardly as is necessary to cause a loosening of the locking screw 37. Then the slide member 30 may be moved to the desired position, following which lever 39 will be operated in the opposite direction to again tighten the locking screw 37, causing it to be urged against the inner surface of the track 32a in the supporting member 33. This will retain the slide member 30 in desired adjusted position with respect to the supporting member 33 and consequently will also position the housing 28 in desired spaced relation with respect to the base 21.

Figure 3:
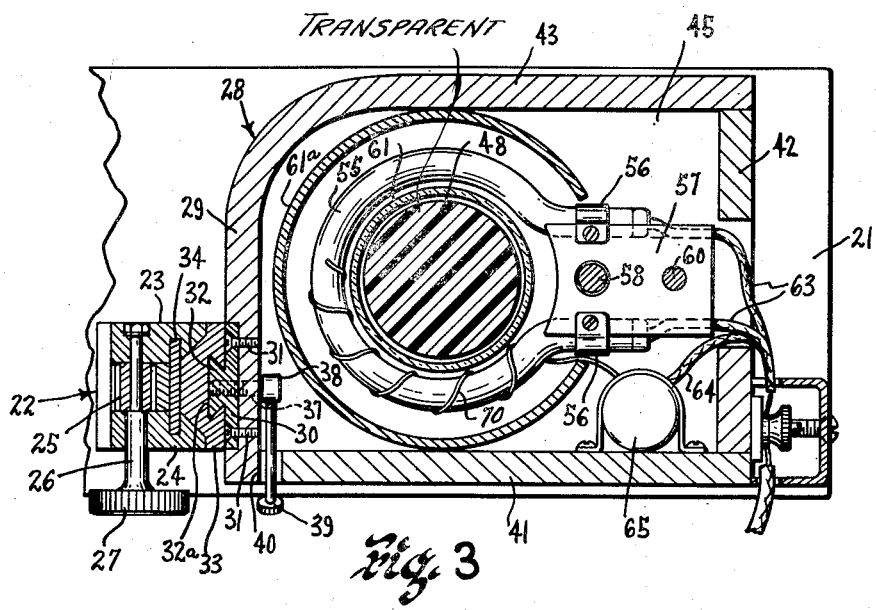
Fig. 3 is an enlarged fragmentary horizontal sectional view taken substantially on line 3—3 of Fig. 2 looking in the direction of the arrows.

The opposed surface of the rack-supporting member 33 has a vertically extending guide plate 34 secured thereto as by screws 35 or the like (Fig. 2), the screws 35 also being adapted to retain a vertically disposed toothed rack 36 in fixed position against the opposed surface of the guide plate 34 (Figs. 2 and 3). The rack 36 is adapted to be positioned between the upwardly extending portions 23 and 24 of the upright 22 and in meshed relation with the pinion 25. The guide plate 34 has its opposed side edges slidably positioned within vertically extending grooves provided therefor in the inner surface of the respective portions 23 and 24 whereby the assembly is prevented from lateral displacement. Thus, when the knob 27 is manually rotated the pinion 25 will consequently also be rotated and will, due to its meshed relation with the rack 36, cause the rack 36, guide plate 34, supporting member 33, and slide member 30 to be moved upwardly or downwardly in accordance with the direction of rotation of the knob 27.

This latter adjustment is preferably used as the major adjustment whereby the housing 28 can be more accurately and quickly positioned as desired. For this reason the rack 36 is formed with diagonally cut teeth and the pinion 25 is a spiral pinion of involute tooth design whereby an operator can more accurately and easily adjust the device as desired and said device will remain in said adjusted position.

The walls 29 and 41, opposed walls 42 and 43, together with top 44 and bottom 45 complete the box-like housing 28. The top 44 and bottom 45 of the housing 28 are provided with concentric openings 46 and 47 respectively through which extends a light transmitting device which in Figs. 2 and 3 is disclosed as a solid bar-like member 48 formed of glass, Lucite, or suitable light transmitting material. The lower end of the member 48 is mounted on the base 21 over an opening 49 therein (Fig. 2). Located in the opening 49 beneath the adjacent end of the member 48 is a condenser lens 50 which is retained in the opening 49 by a ring-like retainer 51 which is threadedly or otherwise attached to the base 21. The under side of the base 21 is preferably recessed as indicated by numeral 52 and has secured thereto a bracket 53 which serves to support a lamp 54, the bracket 53 being so located with respect to the opening 49 that the lamp 54 will be positioned immediately below the condensing lens 50 whereby when the lamp is lighted the light will pass through the condensing lens 50 and longitudinally of the member 48.

Any suitable means may be provided for permitting electrical energy to flow to the lamp for causing operation thereof. A specimen which is to be viewed through the microscope 10 is located on the upper end of the light transmitting member 48. Thus, when the lamp 54 is lighted, the light in passing through the member 48 will illuminate the under side of the specimen and, if the specimen is translucent or transparent, will pass through the specimen. Thus, ordinary transmission viewing is provided.

To provide improved and efficient lighting for photographing the specimen, a flashtube 55 is disposed in encircling relation with the member 48. The flashtube 55 may be of any known conventional gas-filled type having its ends attached, as shown in Fig. 3, by brackets 56 to a supporting plate 57. The supporting plate 57 is provided with a vertical opening therethrough which is adapted to receive a threaded drive shaft 58, the drive shaft 58 having its ends rotatably mounted in the top 44 and bottom 45 of the housing 28 and having a manually operable knob 59 attached to its upper end whereby an operator may rotate the shaft 58 and consequently move the supporting plate 57 and flashtube 55 up or down in accordance with the direction of rotation of knob 59. A guide rod 60 having its ends securely mounted in the top 44 and bottom 45 of the housing 28 extends through the supporting plate 57 and serves to prevent rotation of the supporting plate 57 about the shaft 58 as it is moved up and down.

A tubular light diffusing member 61 is mounted in encircling relation with the light transmitting member 48 between said member 48 and the flashtube 55 and has its opposed ends secured to the top 44 and bottom 45 of the housing 28 adjacent the openings 46 and 47 therein. When the flashtube 45 is lighted the light therefrom will be diffused by the diffusing member 61 and thus a specimen on the end of the member 48 will be provided with substantially shadowless lighting. A curved reflector 61a is positioned in encircling relation with the flashtube 55, diffusing member 61, and light transmitting member 48 to direct additional light toward the member 48 and consequently to the specimen being photographed.

It will be understood that operation of the mechanisms for raising and lowering the housing 28 and the flashtube 55 will permit controlled illumination of the specimen as desired through a relatively wide range. For example, if high oblique lighting is desired the lever 39 will first be operated to raise the housing 28 to the approximate height desired and the knob 27 then rotated to provide the final adjustment of the housing, the specimen, of course, being immovable since the member 48 on which it is located is stationary. The flashtube 55 is meanwhile adjusted by operation of the knob 59 to a position where it will be located above the plane of the specimen. Thus, when the flashtube 55 is operated the major part of the light therefrom passing through the diffusing member 61 will strike the specimen obliquely. The device can be similarly adjusted to permit illumination from below the plane of the specimen or from any intermediate position.

The means for operating the flashtube 55 may be of any suitable conventional type such as is shown diagrammatically in Fig. 4. A source of current SC is connected to suitable electrical controls which are provided in the control box 62. Suitable connections 63 serve to electrically connect the ends of the flashtube 55 with the control box 62 while other leads 64 electrically connect said control in the control box 62 with a trigger circuit 65. Any suitable switch mechanism such, for example, as the switch indicated by numeral 66 in Fig. 4 is connected by suitable leads 67 to the trigger circuit 65 and is adapted to be operated by conventional mechanism within the camera 11 whereby a shutter 68 or other operating member is adapted to operate the switch when moved into position against the switch-operating button 69 as shown diagrammatically in Fig. 4. The trigger circuit 65 is provided with a wire 70 leading therefrom to the flashtube 55, the wire 70 being wound around a portion of the flashtube 55. The potential of the flashtube 55 is normally maintained below the firing point. The general control circuit is preferably a high voltage high capacity condenser and rectifier circuit. Thus, when the switch 66 is operated, the trigger circuit 65 will cause a pulse of sufficient potential to appear on the wire 70 and cause the ionization of the gas within the flashtube 55. In this way the switch 66 can be caused to operate synchronously with the operation of the shutter 68 and thus cause synchronous operation of the flashtube 55.

Although the foregoing description refers to the light transmitting device as being in the form of a substantially solid bar-like member 48 of light transmitting material, it is to be understood that the device may be formed substantially as shown in Fig. 5 wherein there is provided a vertically extending tubular member 71 which has one end located over the opening 49 in the base 21. The upper end of the tubular light transmitting member 71 is sealed with a disc 72 of transparent material and the opposed end of the member 71 has a condensing lens 73 positioned therein. Thus, illumination from lamp 54 will pass through condensing lens 73 into the interior of the device and thence upwardly through the disc 72 to a specimen thereon.

From the foregoing description it will be understood that improved means of a novel and efficient nature have been provided for illuminating a specimen to be viewed in a normal manner through a microscope or other optical instrument and embodying novel means for providing substantially shadowless illumination suitable for successful flash photography of specimens located in position for viewing through the instrument. Such illuminating means is especially desirable for use in instruments such as microscopes adapted for three-dimensional photographing of microscopic specimens due particularly to the relative absence of shadows, which feature is in contrast to the conditions considered desirable in monocular viewing and two-dimensional photography.

From the foregoing description it will be apparent that all of the objects and advantages of the invention have been accomplished. Many changes, however, may be made in the details of construction, arrangement of parts, and method shown and described without departing from the spirit of the invention as expressed in the accompanying claims. Therefore, it is to be understood that all matter set forth or shown in the accompanying drawings is to be interpreted as illustrative and not in a limiting sense.

We claim:

1. A base for an optical instrument comprising a base plate, an elongated member formed of light transmitting material having one end secured to said base plate and having a supporting surface on the other end thereof serving as a stage for a specimen, a first illuminating source carried by said base adjacent the end of the stage which is secured thereto whereby illumination of the specimen of an intensity suitable for viewing of the specimen through a microscope is provided by light rays from said first illuminating source which pass through said stage to said specimen thereon, a second illuminating source comprising a flashtube disposed adjacent a side of said light transmitting member whereby additional illumination of said specimen will be provided of an intensity sufficient to permit flash photography of the specimen, light diffusing means between said flashtube and said side of said light transmitting member, said flashtube and light diffusing means being adjustable in a direction longitudinally of said stage whereby said specimen may be illuminated by diffused light from any point with a range extending from a point well above the plane of said supporting surface for a specimen to a point well below said plane, and a housing enclosing said light diffusing means and said flashtube and movable longitudinally of said elongated member to positions at least partially above and partially below the plane of said stage.

2. A base for an optical instrument comprising a base plate, an elongated member formed of light transmitting material having one end secured to said base plate and having a supporting surface on the other end thereof serving as a stage for a specimen, a first illuminating source carried by said base adjacent the end of the stage which is secured thereto whereby illumination of the specimen of an intensity suitable for viewing of the specimen through a microscope is provided by light rays from said first illuminating source which pass through said stage to said specimen thereon, a second illuminating source comprising a flashtube disposed adjacent a side of said light transmitting member whereby additional illumination of said specimen will be provided of an intensity sufficient to permit flash photography of the specimen, light diffusing means between said flashtube and said side of said light transmitting member, said flashtube and light diffusing means being adjustable in a direction longitudinally of said stage whereby said specimen may be illuminated by diffused light from any point within a range extending from a point well above the plane of said supporting surface for a specimen to a point well below said plane, reflecting means encircling said light transmitting stage, diffusing means and flashtube for confining light from said flashtube to the area in the vicinity of said light transmitting stage, and a housing enclosing said reflecting means, light diffusing means and flashtube and movable longitudinally of said elongated member to positions at least partially above and partially below the plane of said stage.

3. A base for an optical instrument comprising a base plate, an elongated light transmitting stage having one end fixedly secured to said base plate and having a supporting surface on the other end thereof serving as a support for a specimen, a housing mounted on said base plate and adjustable in a direction longitudinally of said light transmitting stage, said housing enclosing the major portion of the sides of said light transmitting stage and having aligned openings in its top and bottom through which said light transmitting stage extends, a fixed illuminating source carried by said base adjacent the end of the stage which is secured thereto whereby illumination of the specimen of an intensity suitable for viewing of the specimen through the microscope is provided by light rays from said fixed illuminating source which pass through said stage to said specimen thereon, and a movable illuminating source within said housing comprising a flashtube adjacent with said light transmitting stage whereby additional illumination of said specimen will be provided of an intensity sufficient to permit flash photography of the specimen, said flashtube being independently adjustable within said housing in a direction longitudinally of said light transmitting stage throughout a range from a position well above the plane of said supporting surface to a position well below said plane.

4. A device of the character described comprising an optical instrument embodying a main housing having an objective attached thereto and an eyepiece for viewing a specimen through said objective, a camera carried by said main housing for photographing said specimen through said objective, and means for supporting and illuminating said specimen comprising a base, an elongated member formed of light transmitting material having one end secured to said base and having its other end directed toward said objective, said end of the elongated member which is directed toward said objective providing a stage upon which said specimen is adapted to be positioned, a first illumination source carried by said base adjacent the end of said elongated member which is attached to the base whereby illumination therefrom will be transmitted through said elongated member to said specimen and thence to said objective of an intensity suitable to permit viewing of said specimen in said eyepiece, and a second illumination source comprising a flashtube disposed adjacent a side of said elongated member whereby additional illumination of said specimen will be provided of an intensity sufficient to permit photographing of the specimen with said camera.

5. A device of the character described comprising an optical instrument embodying a main housing having an objective attached thereto and an eyepiece for viewing a specimen through said objective, a camera carried by said main housing for photographing said specimen through said objective, and means for supporting and illuminating said specimen comprising a base, an elongated member formed of light transmitting material having one end secured to said base and having its other end directed toward said objective, said end of the elongated member which is directed toward said objective having a supporting surface thereon providing a stage upon which said specimen is adapted to be positioned, a first illumination source carried by said base adjacent the end of said elongated member which is attached to the base whereby illumination therefrom will be transmitted through said elongated member to said specimen and thence to said objective of an intensity suitable to permit viewing of said specimen in said eyepiece, and a second illumination source comprising a flashtube disposed adjacent a side of said elongated member whereby additional illumination of said specimen will be provided of an intensity sufficient to permit photographing of the specimen with said camera, said flashtube being adjustable in a direction longitudinally of said elongated member throughout a range from a position well above the plane of said supporting surface to a position well below said plane.

6. A device of the character described comprising an optical instrument embodying a main housing having an objective attached thereto and an eyepiece for viewing a specimen through said objective, a camera carried by said main housing for photographing said specimen through said objective, and means for supporting and illuminating said specimen comprising a base, an elongated member formed of light transmitting material having one end secured to said base and having its other end directed toward said objective, said end of the elongated member which is directed toward said objective having a supporting surface thereon providing a stage upon which said specimen is adapted to be positioned, a first illumination source carried by said base adjacent the end of said elongated member which is attached to the base whereby illumination therefrom will be transmitted through said elongated member to said specimen and thence to said objective of an intensity suitable to permit viewing of said specimen in said eyepiece, a second illumination source comprising a flashtube disposed adjacent a side of said elongated member whereby additional illumination of said specimen will be provided of an intensity sufficient to permit photographing of the specimen with said camera, and light diffusing means between said flashtube and said elongated member and in adjacent spaced relation to said elongated member, said flashtube and light diffusing means being adjustable in a direction longitudinally of said elongated member whereby said specimen may be illuminated by diffused light from any point within a range extending from a point well above the plane of said supporting surface for a specimen to a point well below said plane.

7. A device of the character described comprising an optical instrument embodying a main housing having an objective attached thereto and an eyepiece for viewing a specimen through said objective, a camera carried by said main housing for photographing said specimen through said objective, and means for supporting and illuminating said specimen comprising a base, an elongated member formed of light transmitting material having one end secured to said base and having its other end directed toward said objective, said end of the elongated member which is directed toward said objective having a supporting surface thereon providing a stage upon which said specimen is adapted to be positioned, a first illumination source carried by said base adjacent the end of said elongated member which is attached to the base whereby illumination therefrom will be transmitted through said elongated member to said specimen and thence to said objective of an intensity suitable to permit viewing of said specimen in said eyepiece, a second illumination source comprising a flashtube disposed adjacent a side of said elongated member whereby additional illumination of said specimen will be provided of an intensity sufficient to permit photographing of the specimen with said camera, light diffusing means between said flashtube and said elongated member and in adjacent spaced relation to said elongated member, said flashtube and light diffusing means being adjustable in a direction longitudinally of said elongated member whereby said specimen may be illuminated by diffused light from any point within a range extending from a point well above the plane of said supporting surface for a specimen to a point well below said plane, and reflecting means encircling said elongated member, diffusing means and flashtube for confining light from said flashtube to the area in the vicinity of said elongated member.

8. A device of the character described comprising an optical instrument embodying a main housing having an objective attached thereto and an eye piece for viewing a specimen through said objective, a camera carried by said main housing for photographing said specimen through said objective, and means for supporting and illuminating said specimen comprising a base, an elongated light transmitting member having one end fixedly secured to said base and having its other end directed toward said objective, said end of the light transmitting member which is directed toward said objective having a supporting surface thereon providing a stage upon which said specimen is adapted to be positioned, a movable housing mounted on said base and adjustable in a direction toward and away from said objective and longitudinally of said light transmitting member, said movable housing enclosing the major portion of the sides of said light transmitting member and having aligned openings in its top and bottom through which said light transmitting member extends, a fixed illumination source carried by said base adjacent the end of said light transmitting member which is attached to the base whereby illumination therefrom will be transmitted through said light transmitting member to said specimen and thence to said objective of an intensity suitable to permit viewing of said specimen in said eyepiece, and a movable illumination source within said movable housing comprising a flashtube disposed in encircling relation with said light transmitting member whereby additional illumination of said specimen will be provided of an intensity sufficient to permit photographing of the specimen with said camera, said flashtube being independently adjustable within said movable housing in a direction longitudinally of said light transmitting member throughout a range from a position well above the plane of said supporting surface to a position well below said plane.

9. A device of the character described comprising an optical instrument embodying a main housing having an objective attached thereto and an eyepiece for viewing a specimen through said objective, a camera carried by said main housing for photographing said specimen through said objective, and means for supporting and illuminating said specimen comprising a base, an elongated light transmitting member having one end fixedly secured to said base and having its other end directed toward said objective, said end of the light transmitting member which is directed toward said objective having a supporting surface thereon providing a stage upon which said specimen is adapted to be positioned, a movable housing mounted on said base and adjustable in a direction toward and away from said objective and longitudinally of said light transmitting member, said movable housing enclosing the major portion of the sides of said light transmitting member and having aligned openings in its top and bottom through which said light transmitting member extends, a fixed illumination source carried by said base adjacent the end of said light transmitting member which is attached to the base whereby illumination therefrom will be transmitted through said light transmitting member to said specimen and thence to said objective of an intensity suitable to permit viewing of said specimen in said eyepiece, a movable illumination source within said movable housing comprising a flashtube disposed in encircling relation with said light transmitting member whereby additional illumination of said specimen will be provided of an intensity sufficient to permit photographing of the specimen with said camera, light diffusing means between said flashtube and light transmitting member, and reflecting means encircling said light transmitting member, diffusing means and flashtube for confining light from said flashtube to the area in the vicinity of said light transmitting member, said flashtube being independently adjustable within said movable housing in a direction longitudinally of said light transmitting member throughout a range from a position well above the plane of said supporting surface to a position well below said plane.

References Cited in the file of this patent

UNITED STATES PATENTS

| Number | Name | Date |
|---|---|---|
| 1,015,730 | Gill | Jan. 23, 1912 |
| 1,351,562 | Foster | Aug. 31, 1920 |
| 2,059,197 | Backer et al. | Nov. 3, 1936 |
| 2,099,012 | Goodrich et al. | Nov. 16, 1937 |
| 2,144,653 | Graff | Jan. 24, 1939 |
| 2,209,532 | Michel | July 30, 1940 |
| 2,277,697 | Grier | Mar. 31, 1942 |
| 2,471,879 | Lowber et al. | May 31, 1949 |